C. PHILLIPS.
ANIMAL TRAP.
APPLICATION FILED JULY 9, 1913.
1,107,105.
Patented Aug. 11, 1914.
2 SHEETS—SHEET 1.
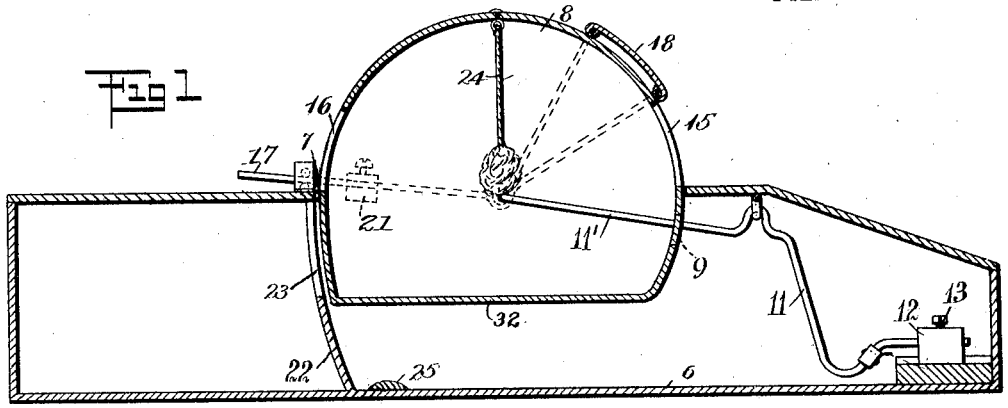
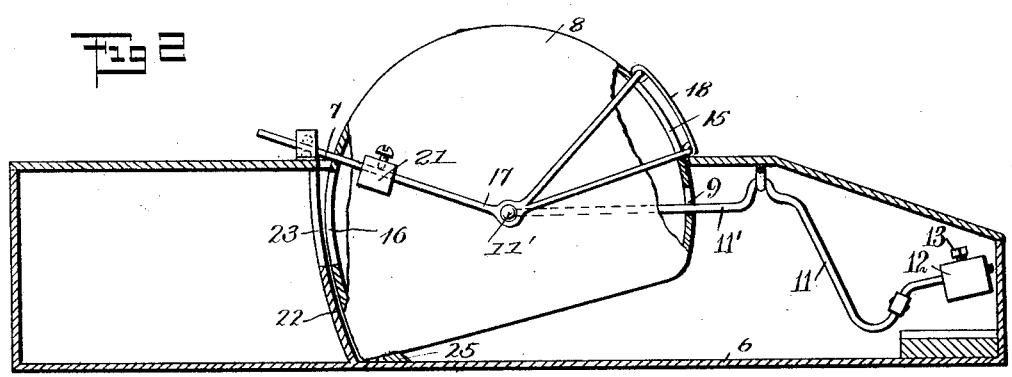
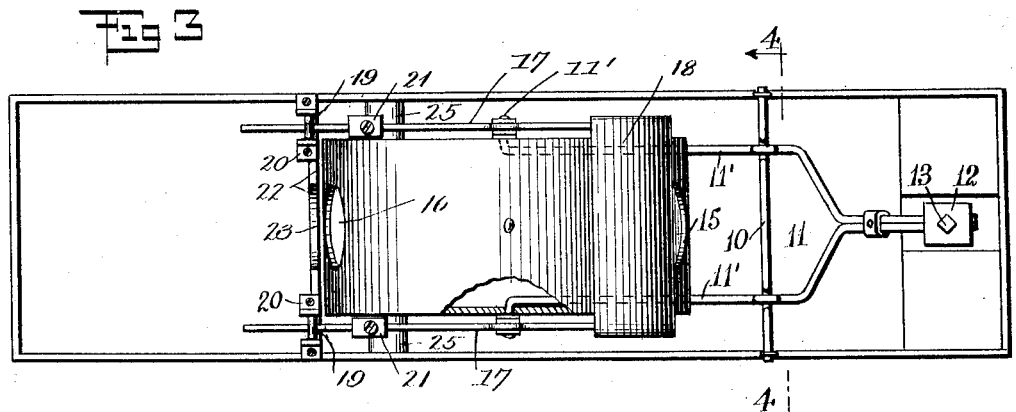
WITNESSES
C. J. Hachenberg
B. Joff
INVENTOR
Charles Phillips
BY Munn & Co.
ATTORNEYS C. PHILLIPS.
ANIMAL TRAP.
APPLICATION FILED JULY 9, 1913.
1,107,105.
Patented Aug. 11, 1914.
2 SHEETS—SHEET 2.
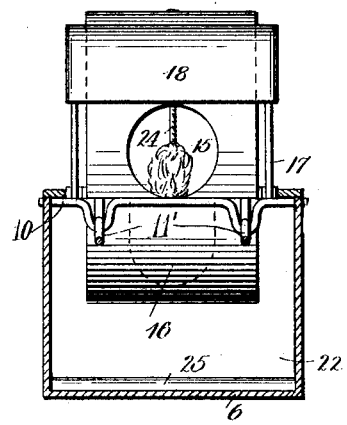
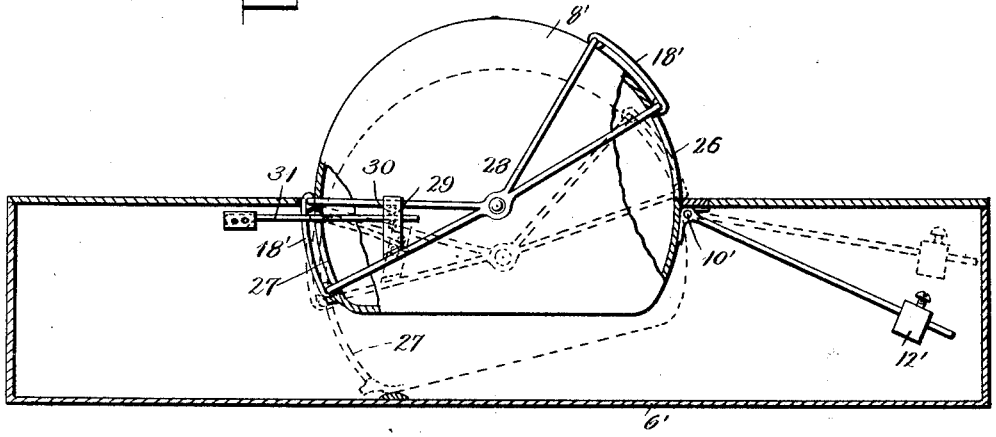
WITNESSES
INVENTOR
Charles Phillips
BY
ATTORNEYS

UNITED STATES PATENT OFFICE.

CHARLES PHILLIPS, OF CROCKER, MISSOURI.

ANIMAL-TRAP.

1,107,105. Specification of Letters Patent. Patented Aug. 11, 1914.

Application filed July 9, 1913. Serial No. 778,067.

*To all whom it may concern:*

Be it known that I, CHARLES PHILLIPS, a citizen of the United States, and a resident of Crocker, in the county of Pulaski and State of Missouri, have invented a new and Improved Animal-Trap, of which the following is a full, clear, and exact description.

The invention relates to animal traps and has reference more particularly to a device comprising a balanced bait compartment and a cage compartment adapted to communicate with the bait compartment when an animal enters the said bait compartment and whereby the animal in the bait compartment can escape only into the cage compartment.

The object of the invention is to provide a simple and inexpensive animal trap which is automatic in its action.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a longitudinal elevated section of an embodiment of my invention; Fig. 2 is a similar section showing the position of the bait compartment when an animal is trapped within; Fig. 3 is a plan view on Fig. 1 with the top removed; Fig. 4 is a section on line 4—4, Fig. 3; and Fig. 5 is a longitudinal section of a modified form of my invention.

Referring to the drawings, 6 represents a casing, which is provided with a lateral opening 7 into which fits loosely the bait compartment 8 having the shape of a drum. The opening 7 is slightly larger than the diameter of the drum, so as to afford freedom of motion to the drum in the opening. Engaging the centers of the side walls of the drum is a bifurcated end of a lever 11, the arm 11' of the bifurcation lying adjacent the side walls and projecting through openings 9 provided in the lateral surface of the drum. Each of the arms 11' is mounted pivotally on a transverse rod 10 secured in the sides of the casing 6 and lying substantially parallel to the lateral surface of the drum. The other end of the lever 11 carries a weight 12 provided with a screw 13 by means of which the weight can be adjusted on this end of the lever. The arms 11', which project through the center of the sides of the drum, allow a slight rocking motion to the drum on these ends, while the entire drum is adapted to swing with the lever 11 on the rod 10. The weight 12 on the lever 11 slightly overbalances the drum 8 and tends to restore it to its normal position, as shown in Fig. 1. The drum 8 is also provided on its lateral surface with substantially opposite openings 15 and 16, both lying above the top of casing 6 when the drum is in position indicated in Figs. 1, 3 and 4. Positioned on each side of the drum are angularly bent levers 17, which are pivotally mounted in the center of the drum on the projecting ends of the arms 11', one end of each lever being V-shaped. These V-shaped ends of the two levers 17 are connected by means of a member 18 extending across and above the lateral surface of the drum 8 adjacent the opening 15 of the drum. The other end of each of the levers 17 engages between rollers 19 positioned in brackets 20 secured to the top of the casing 6 adjacent the opening 7 in the casing. This end of each lever engaging the rollers is provided with an adjustable weight 21, and by means of this weight the member 18 is balanced.

The casing 6 is provided with an inner wall 22 adjacent the side of the opening 7 where the opening 16 of the drum is located. An opening 23 is provided in this wall 22 of substantially the same size as the opening 16. The wall 22 in connection with the top and bottom sides and the adjacent end of the casing form a cage compartment the inlet of which is the opening 23. This cage compartment, if desired, can be made separate from the casing 6, and not integral as shown in the drawing. The drum 8 is also provided with a removable member 24, which is adapted to receive the bait for attracting the animals.

When the animal trap is in normal position, as shown in Fig. 1, the weight 12 on the lever 11 maintains the drum 8, as shown in Fig. 1. The animal, attracted by the bait, enters through the opening 15 or 16 by placing his forward legs on the bottom 32 of the drum 8, which will disturb the balance of same and the drum will move downward to the position indicated in Fig. 2, forcing the animal to enter the bait compartment, that is, the drum 8. Due to the downward motion of the drum about the rod as an axis, the member 18 will move from the position shown in Fig. 1 to the position shown in Fig. 2, closing the opening 15, that is, preventing the escape of the animal through this opening. The opening 16 previous to his entrance was a light inlet which might have appeared to the animal as an escape. When the drum is in position shown in Fig. 2, the opening 16 registers with the opening 23 of the wall 22, which permits the animal to pass from the bait compartment to the cage compartment, and as soon as the animal passes into the cage compartment the weight 12 restores the bait compartment to its normal position, shown in Fig. 1. The bottom 32 of the drum 8 is formed by flattening a part of this lateral surface, thus giving a better foot rest. The bottom of the casing is provided with a cross member 25 forming a stop for the drum when it is moved from the position shown in Fig. 1 to the position shown in Fig. 2. The distance from the bottom of the drum to the entrance to it is substantially half the length of the animal for which the trap is to be used.

In the modification shown in Fig. 5, the drum 8' is similarly balanced by means of a weight 12', as described, but the lateral openings 26 and 27 are diametrically opposite each other, of which the lateral opening 26 lies above the casing 6' adjacent where the drum 8' is pivotally mounted on the rod 10', while the opening 27 lies within the casing 6'. The drum is also provided with centrally pivoted angular levers 28, each end of which is V-shaped; and the opposite ends of the levers 28 are connected by means of members 18' extending similarly to the member 18 previously described. The opening 27 is normally closed by this member 18', that is, when the drum is in position as shown in full lines in Fig. 5. The arms of the lever 28, carrying the member 18' covering the opening 27, are provided with a cross-piece 29 having a clasp 30 engaging the end of a rod 31, the opposite end of which is rigidly secured to the side of the casing 6'. This engagement between the rod 31 and the lever 28 causes the motion of the lever 28 on its pivot when the drum is moved from the position shown in full line to the position shown in dotted line. When the animal enters through the opening 26 into the bait compartment, as described previously for the opening 15, the drum is displaced from the position shown in full line to the position shown in dotted line. This movement causes the displacement of the lever 28, with the member 18' attached thereto, from the position shown in full line to the one shown in dotted line. This movement closes the opening 26, while it leaves the opening 27 open, permitting the animal to pass through the bait compartment into the casing 6'.

Having thus described my invention, I claim as new and desire to secure by Letters Patent:

1. In an animal trap, a casing having an opening in the top thereof; a drum engaging said opening; means pivotally securing the lateral surface of the drum to the casing adjacent the opening; means in said casing associated with the drum for balancing the same on the said pivotal means, said drum having lateral openings therein; a cover for one of said openings; means associated with said cover and drum adapted to close said opening when said drum is disturbed from its balance; and a wall in said casing having an opening therein adapted to register with an opening of the drum when the same is in unbalanced position.

2. In an animal trap, a bait compartment pivotally mounted adjacent the lateral surface thereof; means for maintaining the bait compartment in balance, said bait compartment having an inlet; and a cage compartment having an inlet adapted to register with the inlet of the bait compartment when the said bait compartment is in unbalanced position.

3. In an animal trap, a casing having an opening in the top thereof; a balanced bait compartment pivotally mounted adjacent one end of said opening in said casing, said bait compartment having an animal inlet normally above said casing; and a cage compartment in said casing adapted to register with said inlet of the bait compartment when said bait compartment is displaced from its normal position.

4. In an animal trap, a casing having a cage compartment and an opening at the top thereof; a bait compartment engaging said opening; means for pivotally connecting the bait compartment to the casing in said opening; means for balancing said bait compartment in the opening on the pivotal means, said bait compartment having a pair of openings; and balanced means associated with said bait compartment for closing or opening said openings, said cage compartment in said casing having an opening adapted to register with one of the openings in said bait compartment when said bait compartment is in unbalanced position.

5. In an animal trap, a casing having a cage compartment with an opening at the top thereof; a bait compartment engaging said opening; means for pivotally connecting the bait compartment to the casing in said opening adjacent the lateral surface of said bait compartment; means for balancing said bait compartment in the opening, said bait compartment having a pair of openings; and balanced means associated with said bait compartment controlling said openings and operated by the displacement of said bait compartment on its pivot, said balanced means, when said drum is in normal position, uncovers one opening and closes the other opening, while when said bait compartment is in displaced position the normally uncovered opening becomes closed and the normally covered opening becomes uncovered, said cage compartment in said casing having an opening adapted to register with the uncovered opening in said bait compartment when the same is in displaced position.

In testimony whereof I have signed my name to this specification in the presence of two subscribing witnesses.

CHARLES PHILLIPS.

Witnesses:
LOUIS F. NEESE,
NORA BENTLAGE.

Copies of this patent may be obtained for five cents each, by addressing the "Commissioner of Patents, Washington, D. C."